(12) United States Patent
Chen

(10) Patent No.: US 10,890,832 B2
(45) Date of Patent: Jan. 12, 2021

(54) OPTICAL DEVICE AND OPTICAL MODULE

(71) Applicant: Coretronic Corporation, Hsin-Chu (TW)

(72) Inventor: Wei-Hao Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/712,786

(22) Filed: Dec. 12, 2019

(65) Prior Publication Data

US 2020/0201150 A1 Jun. 25, 2020

(30) Foreign Application Priority Data

Dec. 24, 2018 (CN) ..................... 2018 2 2170012 U

(51) Int. Cl.
*G03B 21/14* (2006.01)
*H04N 9/31* (2006.01)

(52) U.S. Cl.
CPC ......... *G03B 21/142* (2013.01); *H04N 9/3188* (2013.01)

(58) Field of Classification Search
CPC ... G03B 21/142; G03B 21/145; H04N 9/3188
See application file for complete search history.

(56) References Cited

U.S. PATENT DOCUMENTS

2005/0275810 A1* 12/2005 Choi .................... G03B 21/005
353/69

FOREIGN PATENT DOCUMENTS

| CN | 105467726 | 4/2016 |
|---|---|---|
| TW | 201816502 | 5/2018 |

* cited by examiner

*Primary Examiner* — Ryan D Howard
(74) *Attorney, Agent, or Firm* — JCIPRNET

(57) ABSTRACT

Disclosed is an optical device, comprising a supporting structure, at least one first driving element, at least one second driving element and a light-transmitting plate body. The supporting structure has a first side and a second side opposing each other and comprises a base and a frame mutually connected to each other, the base has at least one first supporting part, the frame has at least one second supporting part and at least one third supporting part, the first supporting part and the second supporting part are positioned on the first side, and the third supporting part is positioned on the second side. Furthermore, an optical module having the above optical device is disclosed. The optical device of the invention may be properly installed in a limited space inside a projector.

18 Claims, 4 Drawing Sheets

OPTICAL DEVICE AND OPTICAL MODULE

CROSS-REFERENCE TO RELATED APPLICATION

This application claims the priority benefit of China application serial no. 201822170012.5 filed on Dec. 24, 2018. The entirety of the above-mentioned patent application is hereby incorporated by reference herein and made a part of this specification.

BACKGROUND OF THE INVENTION

1. Field of the Invention

The invention relates to an optical device and an optical module, and particularly relates to an optical device and an optical module applicable to projectors.

2. Description of Related Art

A projection device is a display device for generating a image. The imaging principle of the projection device is to convert an illumination beam generated by a light source into an image beam by a light valve, and then project the image beam onto a screen or a wall by a lens.

The resolution of the image converted by the light valve has gradually failed to meet the market demand. In order to further increase the image resolution, a high-resolution light valve may be used in the projection device, but the issue of expensive projection devices may incur. In addition, in some projection devices, an optical module with an optical vibration technique may be additionally configured to further increase the resolution of the image converted by the light valve. The optical module is generally configured on an optical path between optical components (such as light valves, prisms, lenses, etc.) in the projection device. However, the configuration space between the optical components is limited. Therefore, how to properly mount the optical module in a limited configuration space according to the size and shape of the optical components is an important issue in the design of the optical module.

The information disclosed in this Background section is only for enhancement of understanding of the background of the described technology and therefore it may contain information that does not form the prior art that is already known to those skilled in the art. Further, the information disclosed in the Background section does not mean that one or more problems to be resolved by one or more embodiments of the invention was acknowledged by those skilled in the art.

SUMMARY OF THE INVENTION

The invention provides an optical device and an optical module, which enables the optical device and the optical module to be properly installed in a limited configuration space among optical components in a projector.

Other objectives and advantages of the invention may be further understood from the technical features disclosed in the invention.

In order to achieve one, some, or all of the aforementioned objectives or other objectives, an embodiment of the invention provides an optical device which comprises a supporting structure, at least one first driving element, at least one second driving element, and a light-transmitting plate body. The supporting structure has a first side and a second side opposing each other, wherein the supporting structure comprises a base and a frame mutually connected to each other, the base has at least one first supporting part, the frame has at least one second supporting part and at least one third supporting part, the at least one first supporting part and the at least one second supporting part are positioned on the first side, and the at least one third supporting part is positioned on the second side. The at least one first driving element is configured on the base and bears against the at least one first supporting part. The at least one second driving element is configured on the frame and bears against the at least one second supporting part, wherein the frame may deflect relative to the base by the at least one first driving element and the at least one second driving element. The light-transmitting plate body is configured on the frame and bears against the at least one third supporting part.

In order to achieve one, some, or all of the aforementioned objectives or other objectives, an embodiment of the invention provides an optical module which comprises a first optical component, a second optical component and an optical device. The optical device is configured between the first optical component and the second optical component and comprises a supporting structure, at least one first driving element, at least one second driving element and a light-transmitting plate body. The supporting structure has a first side and a second side opposing each other, wherein the first side faces the first optical component, and the second side faces the second optical component; the supporting structure comprises a base and a frame mutually connected to each other, the base has at least one first supporting part, the frame has at least one second supporting part and at least one third supporting part, the at least one first supporting part and the at least one second supporting part are positioned on the first side, and the at least one third supporting part is positioned on the second side. The at least one first driving element is configured on the base and bears against the at least one first supporting part. The at least one second driving element is configured on the frame and bears against the at least one second supporting part, wherein the frame may deflect relative to the base by the at least one first driving element and the at least one second driving element. The light-transmitting plate body is configured on the frame and bears against the at least one third supporting part.

Based on the above, the embodiments of the invention at least have one of the following advantages or effects. In the optical device of the invention, compared to the first supporting part and the second supporting part on the first side of the supporting structure, the third supporting part for supporting the light-transmitting plate body is positioned on the second side of the supporting structure, so that the supporting structure does not increase in thickness due to the third supporting part. For example, the third supporting part and a smaller second optical component (such as a light valve) may be positioned on the same side of the supporting structure, while a larger first optical component (such as a prism) may be positioned on the other side of the supporting structure. Thereby, the third supporting part may be prevented from structurally interfering with the larger first optical component, and because the second optical component has a smaller size, the third supporting part on the same side as the second optical component can reasonably utilize the space between the second optical component and the supporting structure without structurally interfering with the second optical component.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
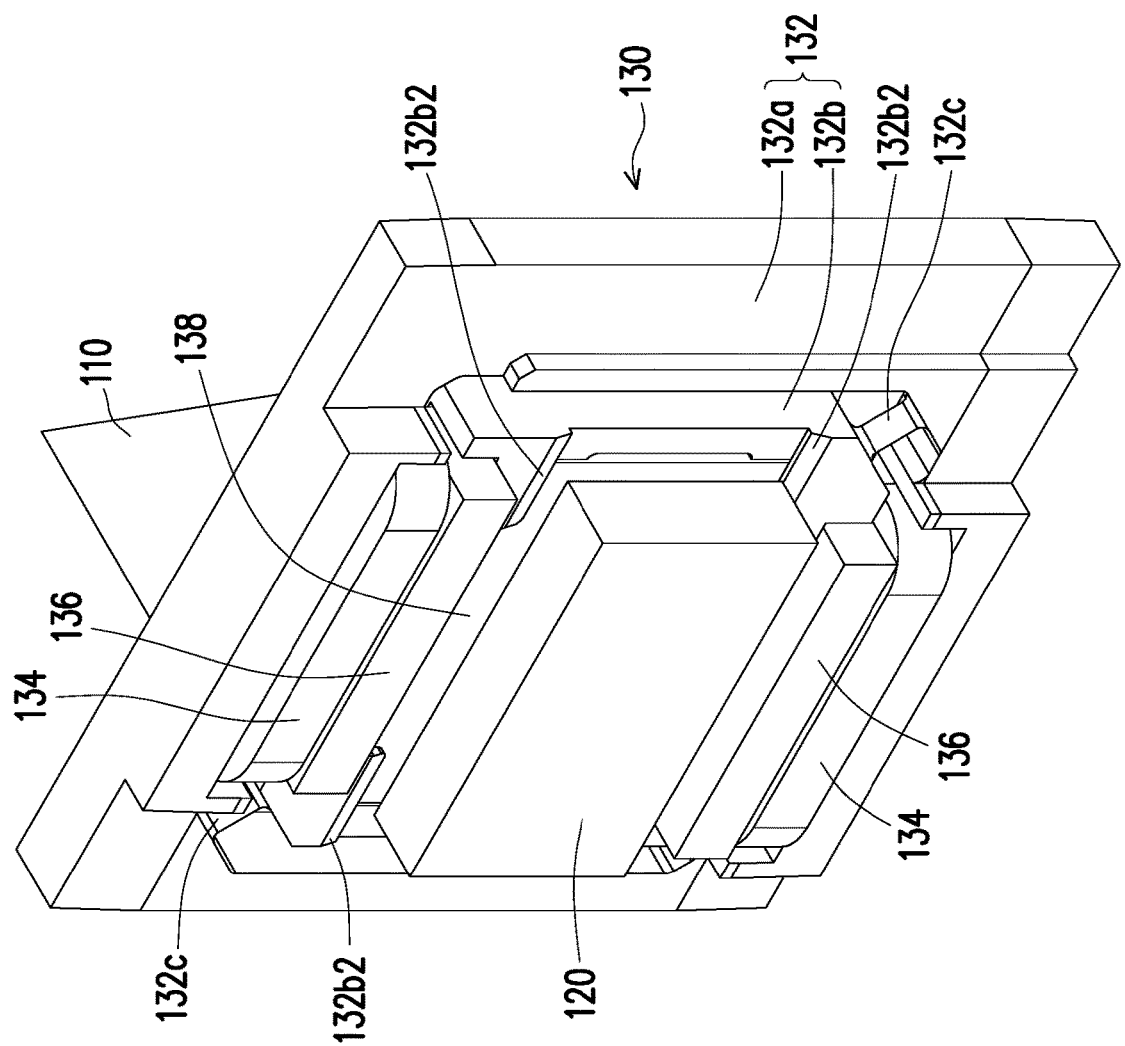
FIG. 1 is a perspective view of an optical module of an embodiment of the invention.

FIG. 1 is a perspective view of an optical module of an embodiment of the invention. Referring to FIG. 1, the optical module 100 of the present embodiment comprises a first optical component 110, a second optical component 120, and an optical device 130.

The optical module 100 of the present embodiment is arranged in a projector, and the projector further comprises a light source and a projection lens (not shown). The light source provides an illumination beam, and the second optical component 120 of the optical module 100 is positioned on the transmission path of the illumination beam and is used to convert the illumination beam into an image beam. The projection lens is positioned on the transmission path of the image beam and is used to project the image beam to the outside of the projector. The optical device 130 of the present embodiment is configured on the transmission path of the image beam between the second optical component 120 and the projection lens, and is used to increase the resolution of the image beam by the optical vibration technique. In addition, the first optical component 110 is also positioned on the transmission path of the illumination beam and the image beam. The illumination beam from the light source passes through the first optical component 110 and the optical device 130, and is transmitted to the second optical component 120. The second optical component 120 converts the illumination beam into the image beam and reflects the image beam back to the first optical component 110 for transmission to the projection lens. The first optical component 110 is arranged on the transmission path of the image beam between the second optical component 120 and the projection lens.

The first optical component 110 is, for example, a prism that may be used for a projector. For example, the first optical component 110 may be a prism assembly such as a total internal reflection prism (TIR prism), a reverse total internal reflection prism (RTIR prism), or a polarizer prism. In an embodiment, the reverse total internal reflection prism may consist of a triangular prism. The first optical component 110 may comprise a plurality of prisms, but is not necessarily. For example, in the case where the first optical component 110 is a reverse total internal reflection prism (RTIR prism), only a single prism may be included. In addition, the first optical component 110 may also be a combination of a plurality of polygonal prisms or tapered (including triangular) prisms which are mutually matched. The second optical component 120 may be a light modulator (also known as a light valve) in the projector, including, for example, a reflective spatial light modulator. Taking the reflective spatial light modulator as an example, the second optical component 120 may be a Digital Micro-mirror Device (DMD) or a reflective Liquid Crystal on Silicon (LCOS). The optical device 130 is configured between the first optical component 110 and the second optical component 120 to enhance the projection resolution by optical vibration technique. In an embodiment, the optical device 130 may comprise, for example, a supporting structure 132, at least one first driving element 134 (shown as two), at least one second driving element 136 (shown as two), and a light-transmitting plate body 138. The light-transmitting plate body 138 comprises an optical axis A (shown in FIG. 3), the first optical component 110 and the second optical component 120 project on the same plane in a direction perpendicular to the optical axis A of the light-transmitting plate body 138 (shown in FIG. 3), and the size (projected area) of the first optical component 110 is larger than the size (projected area) of the second optical component 120. In other embodiments, the optical axis of the second optical component 120 overlaps with the optical axis A of the light-transmitting plate body 138, the first optical component 110 and the second optical component 120 may be respectively a light valve and a projection lens in the projector or respectively other optical components in the projector, and the invention is not limited thereto. In an embodiment, the light-transmitting plate body 138 may be a glass component. For example, it may be a glass plate having a thickness of less than or equal to 5 mm. The material of the light-transmitting plate body 138 includes various glass materials such as white board glass, borosilicate glass, and quartz glass. In some embodiments, the light-transmitting plate body 138 comprises a material which is light transmissive and refracts light. In other embodiments, the light-transmitting plate body 138 may also be various crystalline materials such as crystal, and sapphire. In some embodiments, the light-transmitting plate body 138 is fixed to the supporting structure 132 by gluing, locking, screwing, and the like.

Figure 2:
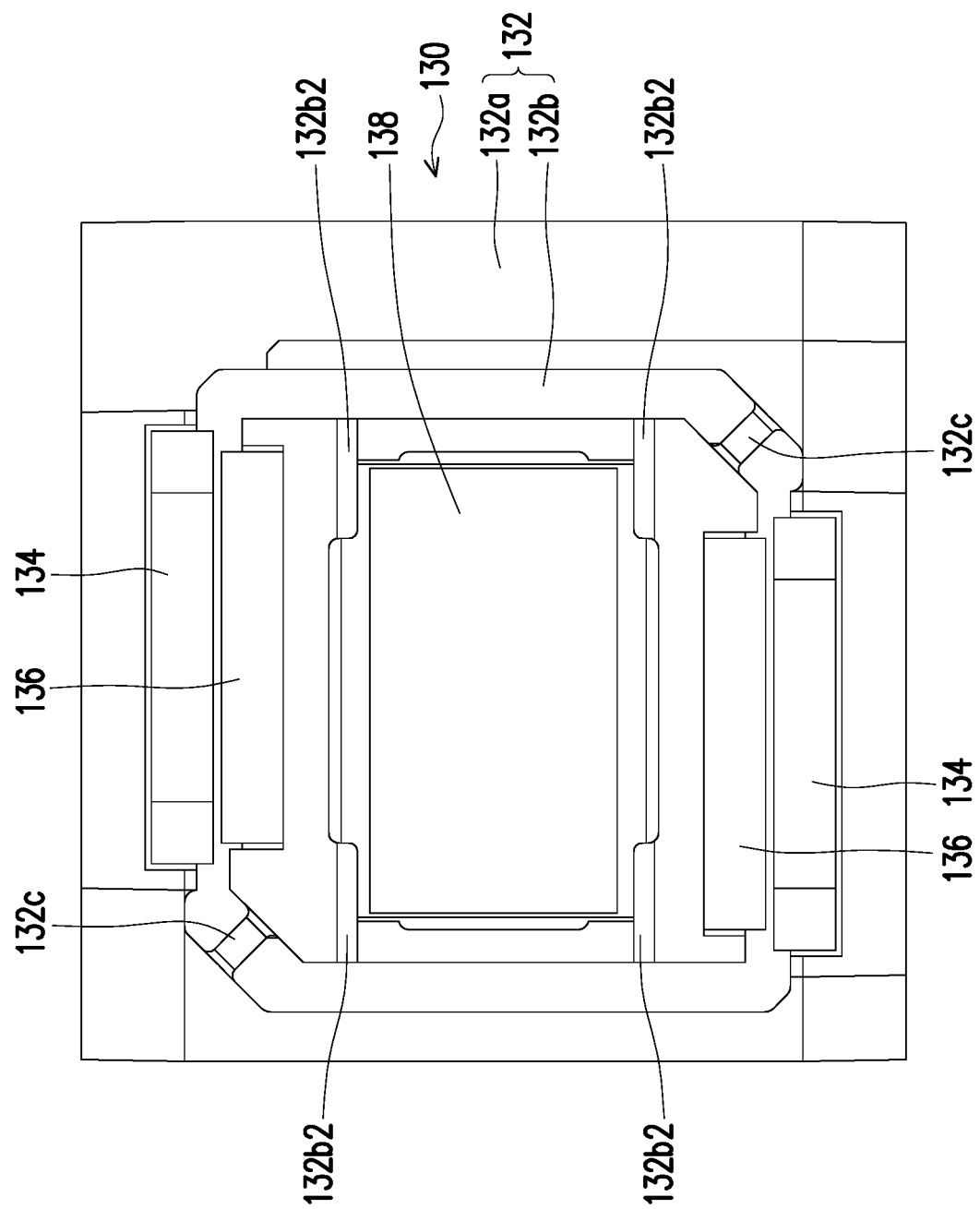
FIG. 2 is a front view of the optical device in FIG. 1.

FIG. 2 is a front view of the optical device in FIG. 1. Referring to FIG. 1 and FIG. 2, in detail, the supporting structure 132 comprises a base 132a and a frame 132b and has at least one shaft 132c (shown as two). The base 132a and the frame 132b are connected mutually by the shaft 132c. The first driving element 134 is configured on the base 132a, and the second driving element 136 and the light-transmitting plate body 138 are configured on the frame 132b. In the present embodiment, the first driving element 134 is, for example, a coil, the second driving element 136 is, for example, a magnet, and a magnetic force generated between the first driving element 134 and the second driving element 136 may drive the shaft 132c to generate reciprocating elastic deformation, thereby enabling the frame 132b to reciprocally deflect relative to the base 132a to cause the light-transmitting plate body 138 to generate reciprocating vibration. In other embodiments, the first driving element 134 may be a magnet, the second driving element 136 may be a coil, and the invention is not limited thereto. In some embodiments, the material of the base 132a and the frame 132b may be non-magnetic. For example, the material of the base 132a and the frame 132b may be a metal material such as aluminium or titanium, or a resin material such as rubber or plastic. However, the invention is not limited thereto.

Figure 3:
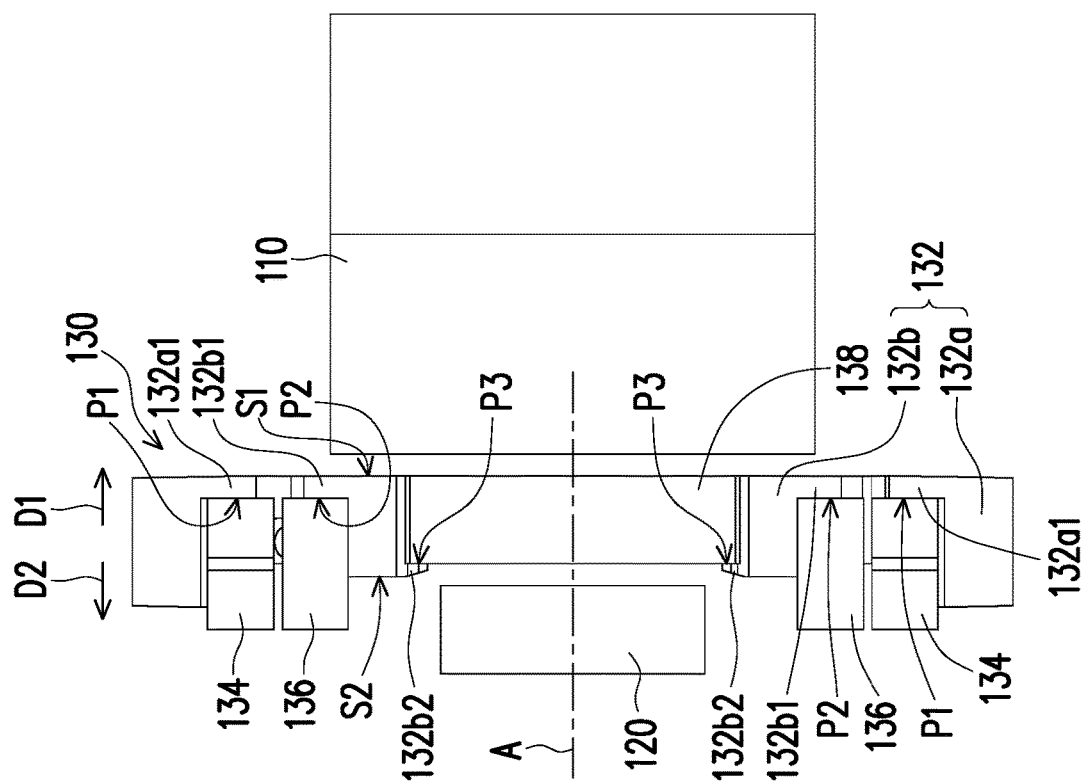
FIG. 3 is a side cross-sectional view of the optical module in FIG. 1.

FIG. 3 is a side cross-sectional view of the optical module in FIG. 1. Referring to FIG. 3, in the present embodiment, in the direction of an optical axis A, the supporting structure 132 has a first side S1 and a second side S2 opposing each other, the first side S1 faces the first optical component 110, and the second side S2 faces the second optical component 120. The base 132a has at least one first supporting part 132a1 (shown as two in FIG. 3), and the frame 132b has at least one second supporting part 132b1 (shown as two in FIG. 3) and at least one third supporting part 132b2 (shown as four in FIG. 2). The first supporting part 132a1 and the second supporting part 132b1 are positioned on the first side S1 of the supporting structure 132, and the third supporting part 132b2 is positioned on the second side S2 of the supporting structure 132. The first driving element 134 bears against a first supporting surface P1 of the first supporting part 132a1 along a first direction D1, the second driving element 136 bears against a second supporting surface P2 of the second supporting part 132b1 along the first direction D1, and the light-transmitting plate body 138 bears against a third supporting surface P3 of the third supporting part 132b2 along the second direction D2. The first direction D1 and the second direction D2 are parallel to the optical axis A of the light-transmitting plate body 138 and are opposite to each other.

As described above, the third supporting part 132b2 for bearing the light-transmitting plate body 138 is not positioned on the first side S1 of the supporting structure 132, but on the second side S2 of the supporting structure 132, so that the third supporting part 132b2 is placed on the same side of the supporting structure 130 as the smaller second optical component 120, and the larger first optical component 110 is positioned on the other side of the supporting structure 130. Thereby, the third supporting part 132b2 may be prevented from structurally interfering with the larger first optical component 110, and because the second optical component 120 has a smaller size, the third supporting part 132b2 on the same side as the second optical component 120 can reasonably utilize the space between the second optical component 120 and the supporting structure 130 without structurally interfering with the second optical component 120.

In addition, the second supporting part 132b1 for bearing the second driving element 136 is not positioned on the second side S2 of the supporting structure 132, but on the first side S1 of the supporting structure 132, so that the second driving element 136 extends from the first side S1 of the supporting structure 132 to the second side S2 of the supporting structure 132 and protrudes out. Thereby, the second driving element 136 is prevented from protruding from the first side S1 of the supporting structure 132 and structurally interfering with the larger first optical component 110. Moreover, since the configuration position of the first driving element 134 needs to correspond to the configuration position of the second driving element 136, the first supporting part 132a1 for bearing the first driving element 134 is also positioned on the first side S1 of the supporting structure 132 as the second supporting part 132b1.

That is, in the present embodiment, the third supporting part 132b2 is formed on the opposite side of the first supporting part 132a1 and the second supporting part 132b1, so as to prevent the third supporting part 132b2 from structurally interfering with the larger first optical component 110, and preventing the second driving element 136 from structurally interfering with the larger first optical component 110. Further, it is unnecessary to increase the space between the first optical component 110 and the supporting structure 132 in order to avoid structural interference.

Further, in the present embodiment, in a direction parallel to the optical axis A of the light-transmitting plate body 138, the first driving element 134 and the second driving element 136 do not overlap with the light-transmitting plate body 138 and the second optical component 120, and the third supporting part 132b2 does not overlap with the second optical component 120. That is, the first driving element 134 and the second driving element 136 are positioned in the peripheral areas of the light-transmitting plate body 138 and the second optical component 120, and the third supporting part 132b2 is positioned in the peripheral area of the second optical component 120. Thereby, the first driving element 134, the second driving element 136, and the third supporting part 132b2 are prevented from structurally interfering with the second optical component 120. Further, it is unnecessary to increase the space between the second optical component 120 and the supporting structure 132 in order to avoid structural interference.

Figure 4:
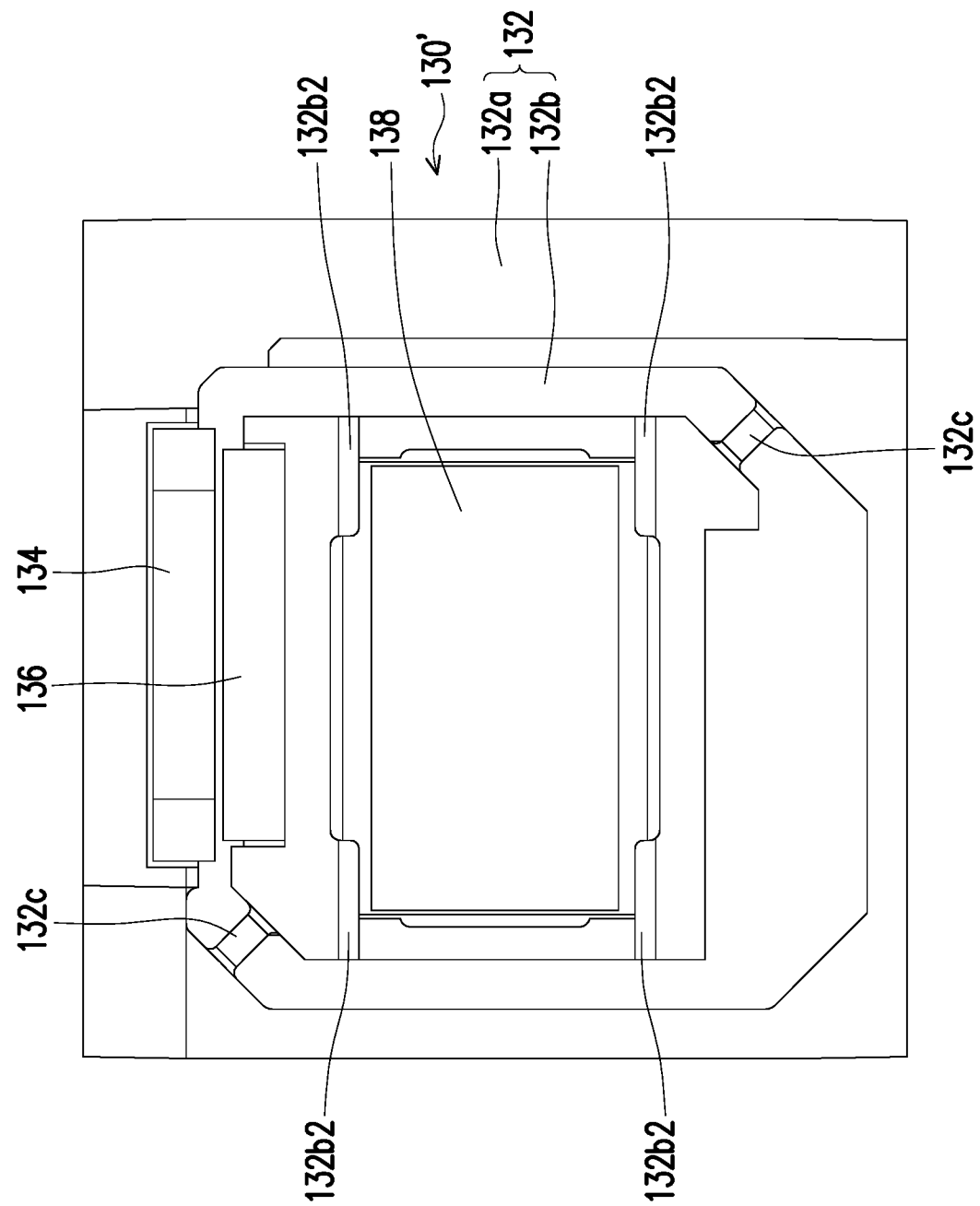
FIG. 4 is a front view of an optical device of another embodiment of the invention.

FIG. 4 is a front view of an optical device of another embodiment of the invention. The difference between the optical device 130' shown in FIG. 4 and the optical device 130 shown in FIG. 2 is that in the optical device 130', the number of the first driving element 134 and the number of the second driving element 136 are respectively one, rather than the number of the first driving elements 134 and the number of second driving elements 136 in FIG. 2 are respectively two.

Based on the above, the embodiments of the invention at least have one of the following advantages or effects. In the optical device of the invention, compared to the first supporting part and the second supporting part on the first side of the supporting structure, the third supporting part for bearing the light-transmitting plate body is positioned on the second side of the supporting structure, so that the supporting structure does not increase in thickness due to the third supporting part. For example, the third supporting part and a smaller second optical component (such as a light valve) may be positioned on the same side of the supporting structure, while a larger first optical component (such as a prism) may be positioned on the other side of the supporting structure. Thereby, the third supporting part may be prevented from structurally interfering with the larger first optical component, and because the second optical component has a smaller size, the third supporting part on the same side as the second optical component can reasonably utilize the space between the second optical component and the supporting structure without structurally interfering with the second optical component. Furthermore, the first driving element, the second driving element and the third supporting part are positioned in the peripheral area of the second optical component, so that the first driving element, the second driving element and the third supporting part are prevented from structurally interfering with the second optical component. Therefore, it is not necessary to increase the space between the first optical component and the supporting structure and the space between the second optical component and the supporting structure in order to avoid the structural interference, and the configuration space is saved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by those skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical device, comprising a supporting structure, at least one first driving element, at least one second driving element and a light-transmitting plate body, wherein:
    the supporting structure comprises a first side and a second side opposing each other, wherein the supporting structure comprises a base and a frame mutually connected to each other, the base comprises at least one first supporting part, the frame comprises at least one second supporting part and at least one third supporting part, the at least one first supporting part and the at least one second supporting part are positioned on the first side, and the at least one third supporting part is positioned on the second side;
    the at least one first driving element is configured on the base and bears against the at least one first supporting part;
    the at least one second driving element is configured on the frame and bears against the at least one second supporting part, wherein the frame deflects relative to the base by the at least one first driving element and the at least one second driving element; and
    the light-transmitting plate body is configured on the frame and bears against the at least one third supporting part.

2. The optical device according to claim 1, wherein the at least one first driving element bears against the at least one first supporting part along a first direction, the at least one second driving element bears against the at least one second supporting part along the first direction, the light-transmitting plate body bears against the at least one third supporting part along a second direction, and the second direction is opposite to the first direction.

3. The optical device according to claim 2, wherein the first direction and the second direction are parallel to an optical axis of the light-transmitting plate body.

4. The optical device according to claim 1, wherein in a direction parallel to an optical axis of the light-transmitting plate body, the at least one first driving element does not overlap with the light-transmitting plate body, and the at least one second driving element does not overlap with the light-transmitting plate body.

5. The optical device according to claim 1, wherein the at least one first supporting part comprises a first supporting surface, the at least one second supporting part comprises a second supporting surface, the at least one third supporting part comprises a third supporting surface, the at least one first driving element bears against the first supporting surface, the at least one second driving element bears against the second supporting surface, and the light-transmitting plate body bears against the third supporting surface.

6. The optical device according to claim 1, wherein one of the at least one first driving element and the at least one second driving element is a coil, and the other one of the at least one first driving element and the at least one second driving element is a magnet.

7. The optical device according to claim 1, wherein the supporting structure comprises at least one shaft, the base and the frame are connected by the at least one shaft, and the frame reciprocally rotates relative to the base by elastic deformation of the at least one shaft.

8. An optical module, comprising a first optical component, a second optical component and an optical device, wherein:

the optical device is configured between the first optical component and the second optical component and comprises a supporting structure, at least one first driving element, at least one second driving element and a light-transmitting plate body, wherein:

the supporting structure comprises a first side and a second side opposing each other, wherein the first side faces the first optical component, and the second side faces the second optical component; the supporting structure comprises a base and a frame mutually connected to each other, the base comprises at least one first supporting part, the frame comprises at least one second supporting part and at least one third supporting part, the at least one first supporting part and the at least one second supporting part are positioned on the first side, and the at least one third supporting part is positioned on the second side;

the at least one first driving element is configured on the base and bears against the at least one first supporting part;

the at least one second driving element is configured on the frame and bears against the at least one second supporting part, wherein the frame deflects relative to the base by the at least one first driving element and the at least one second driving element; and the light-transmitting plate body is configured on the frame and bears against the at least one third supporting part.

9. The optical module according to claim 8, wherein the at least one first driving element bears against the at least one first supporting part along a first direction, the at least one second driving element bears against the at least one second supporting part along the first direction, the light-transmitting plate body bears against the at least one third supporting part along a second direction, and the second direction is opposite to the first direction.

10. The optical module according to claim 9, wherein the first direction and the second direction are parallel to an optical axis of the light-transmitting plate body.

11. The optical module according to claim 8, wherein in a direction parallel to an optical axis of the light-transmitting plate body, the at least one first driving element does not overlap with the light-transmitting plate body and the at least one second driving element does not overlap with the light-transmitting plate body.

12. The optical module according to claim 8, wherein the at least one first supporting part comprises a first supporting surface, the at least one second supporting part comprises a second supporting surface, the at least one third supporting part comprises a third supporting surface, the at least one first driving element bears against the first supporting surface, the at least one second driving element bears against the second supporting surface, and the light-transmitting plate body bears against the third supporting surface.

13. The optical module according to claim 8, wherein one of the at least one first driving element and the at least one second driving element is a coil, and the other one of the at least one first driving element and the at least one second driving element is a magnet.

14. The optical module according to claim 8, wherein the supporting structure comprises at least one shaft, and the base and the frame are connected by the at least one shaft, and the frame reciprocally rotates relative to the base by elastic deformation of the at least one shaft.

15. The optical module according to claim 8, wherein in a direction parallel to an optical axis of the light-transmitting plate body, the at least one third supporting part does not overlap with the second optical component.

16. The optical module according to claim 8, wherein in a direction parallel to an optical axis of the light-transmitting plate body, the at least one first driving element does not overlap with the second optical component, and the at least one second driving element does not overlap with the second optical component.

17. The optical module according to claim 8, wherein in a direction perpendicular to an optical axis of the light-transmitting plate body, the size of the first optical component is larger than the size of the second optical component.

18. The optical module according to claim 8, wherein the first optical component is a prism and the second optical component is a light valve.

* * * * *